Nov. 14, 1944.  P. E. PEARSON  2,362,848
CAN CLOSING MACHINE
Filed Sept. 19, 1940  12 Sheets-Sheet 1
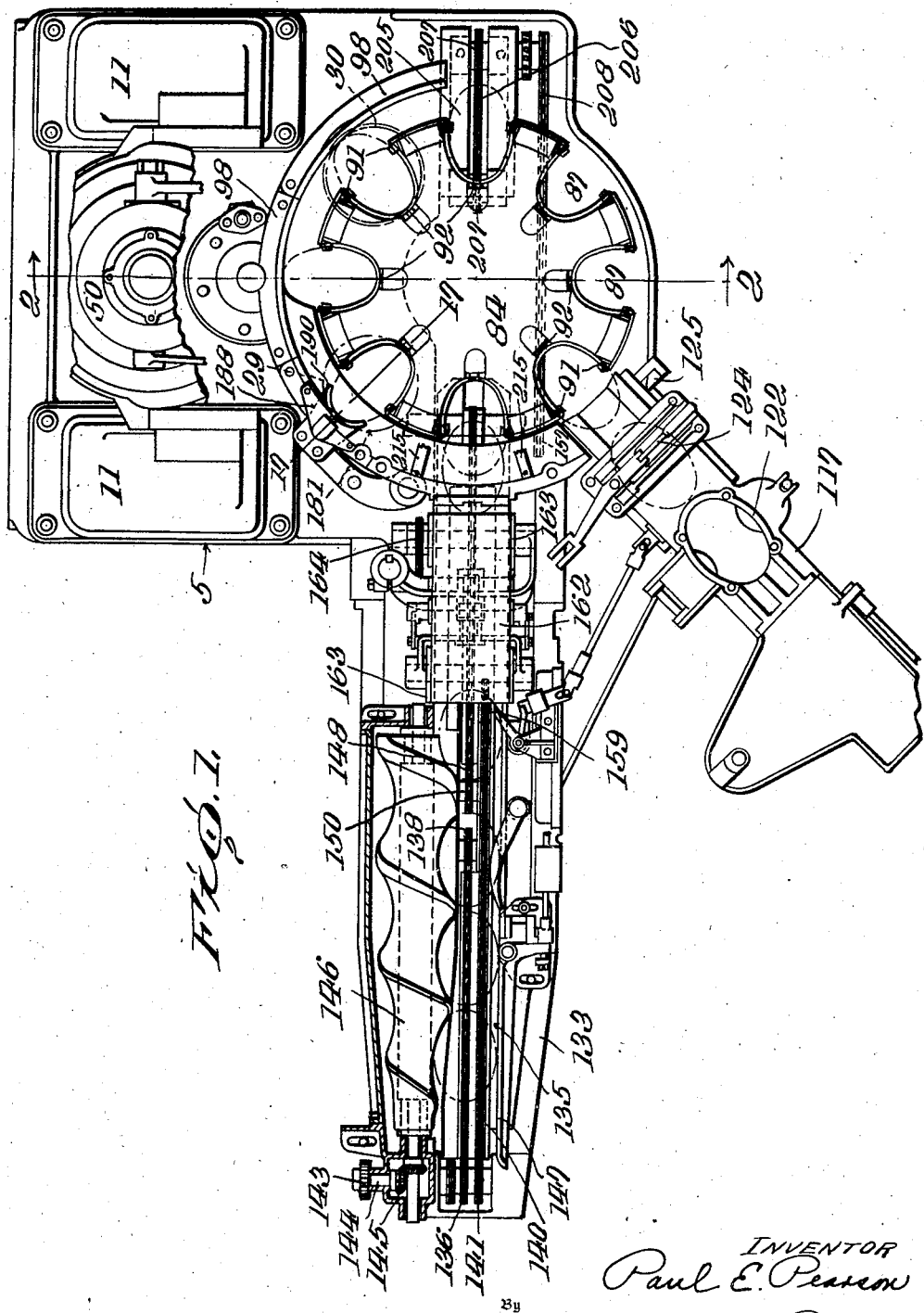

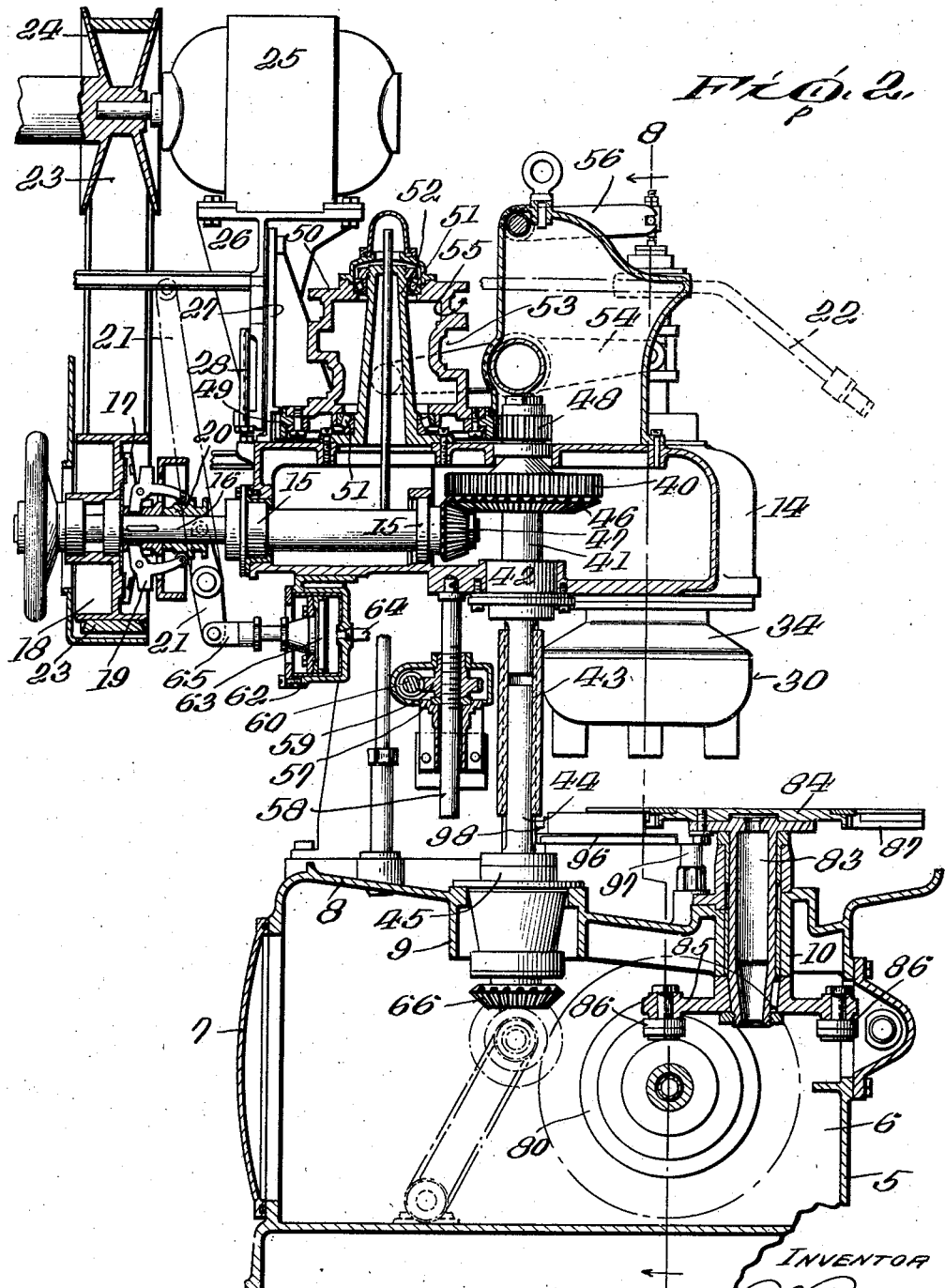

Nov. 14, 1944. P. E. PEARSON 2,362,848
CAN CLOSING MACHINE
Filed Sept. 19, 1940 12 Sheets-Sheet 3
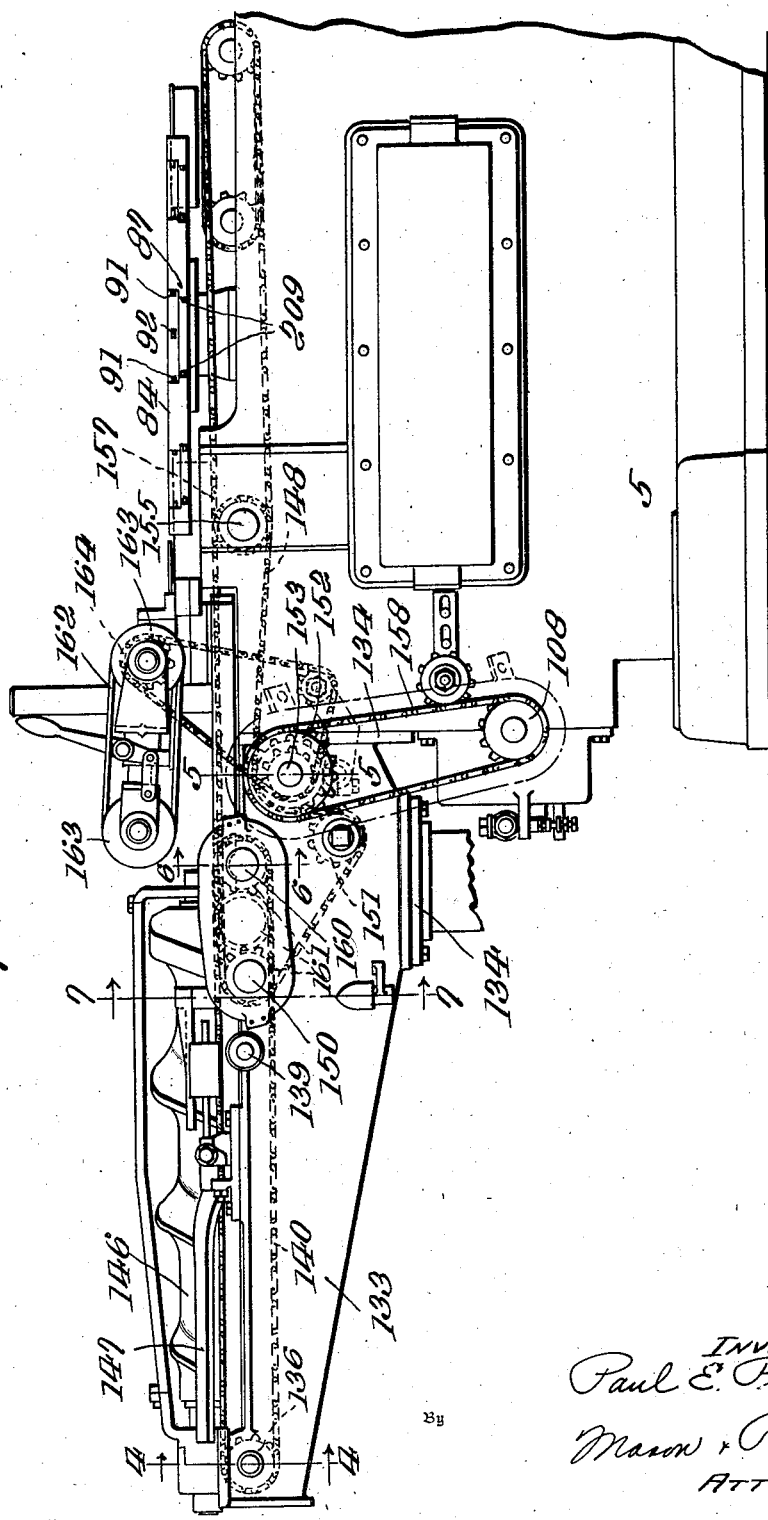

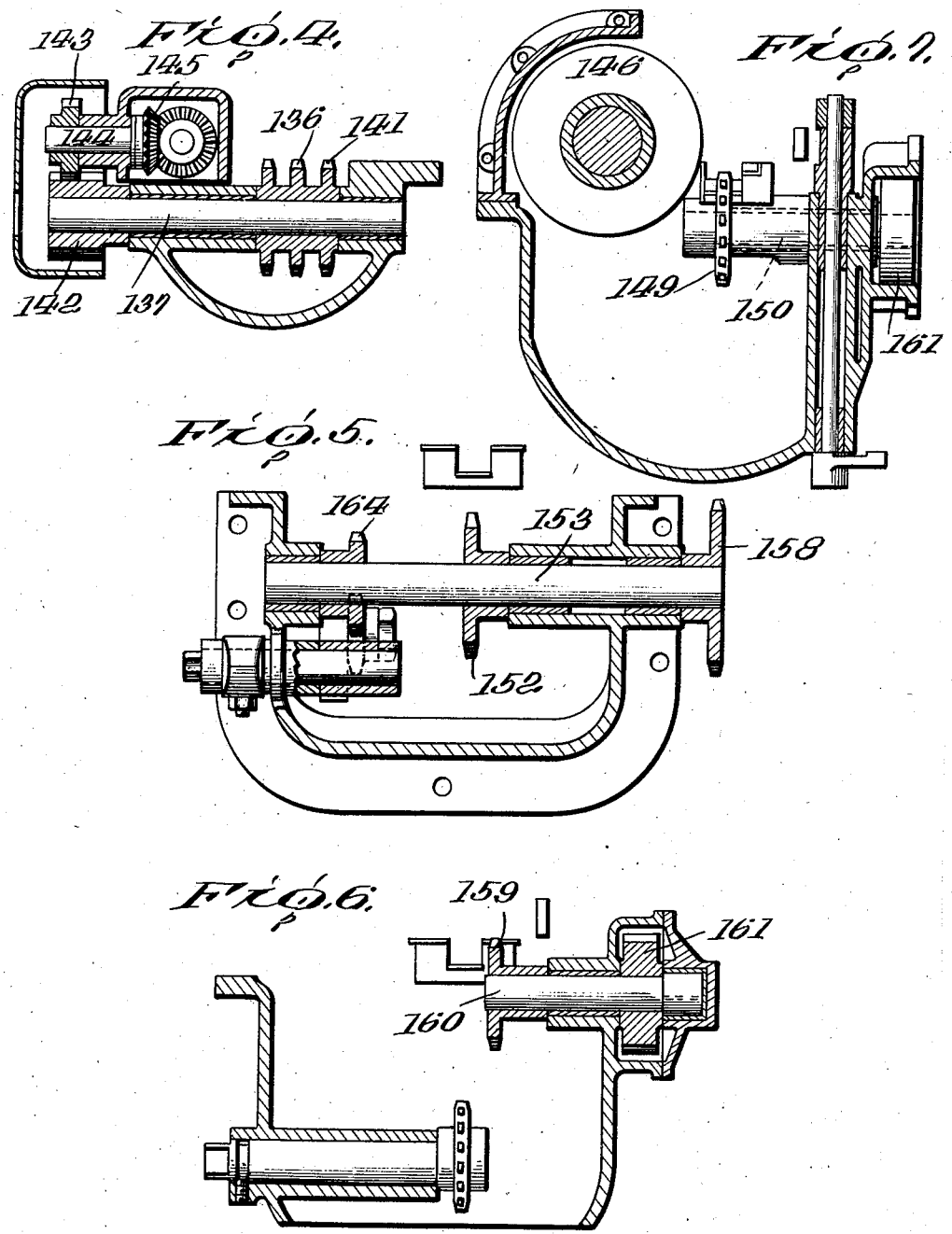

Nov. 14, 1944.   P. E. PEARSON   2,362,848
CAN CLOSING MACHINE
Filed Sept. 19, 1940   12 Sheets-Sheet 5

INVENTOR
Paul E. Pearson
Mason & Porter
ATTORNEYS

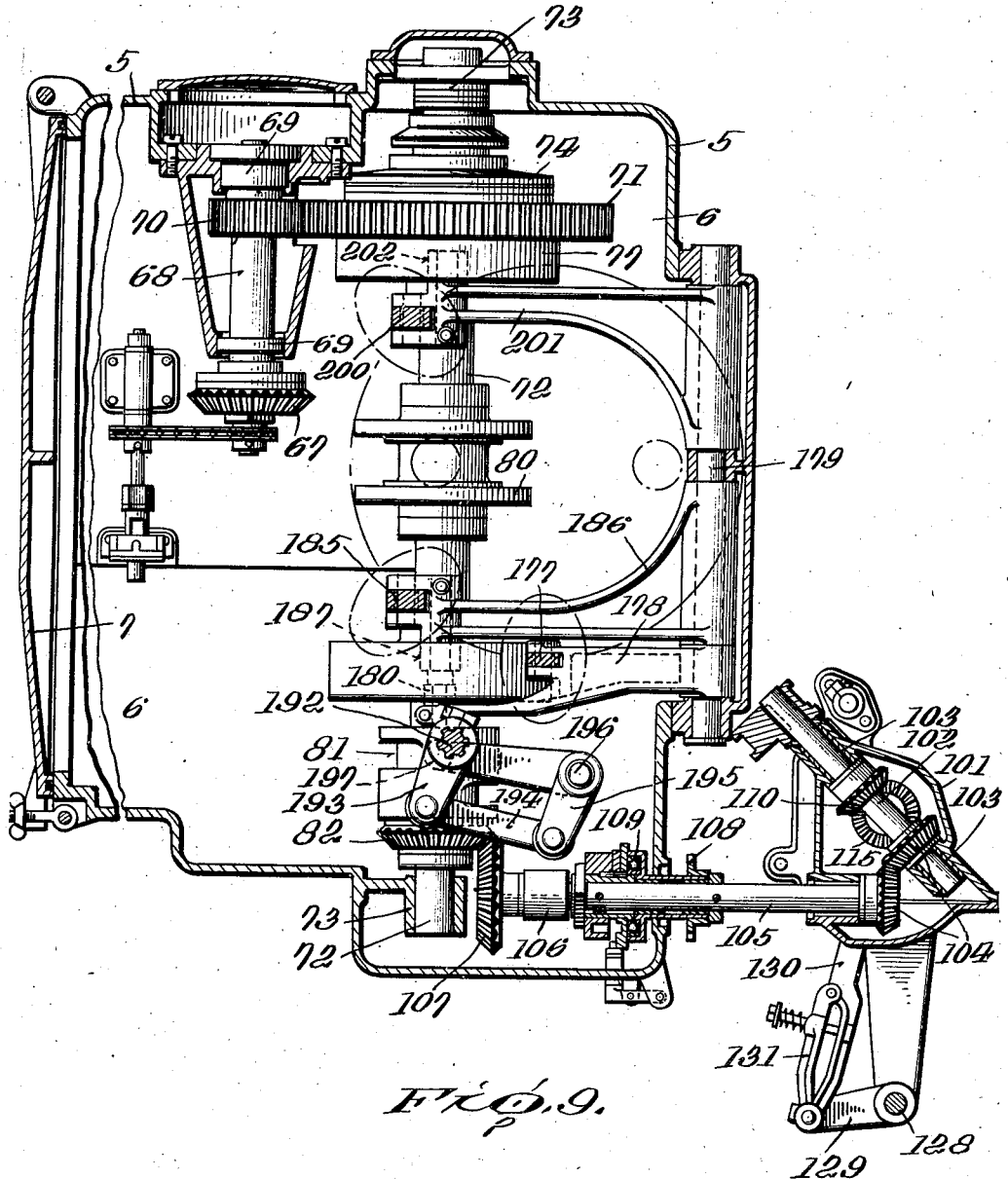

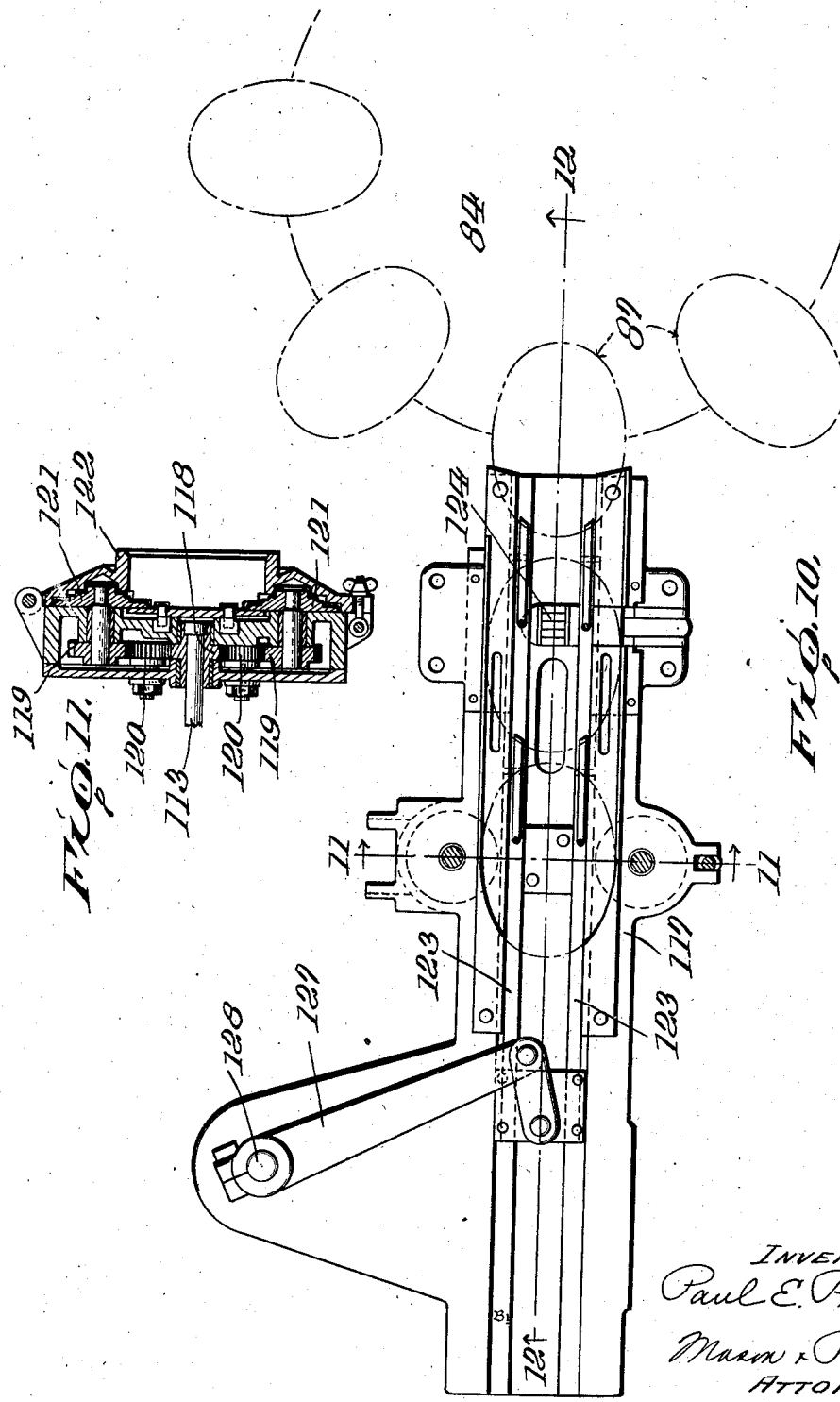

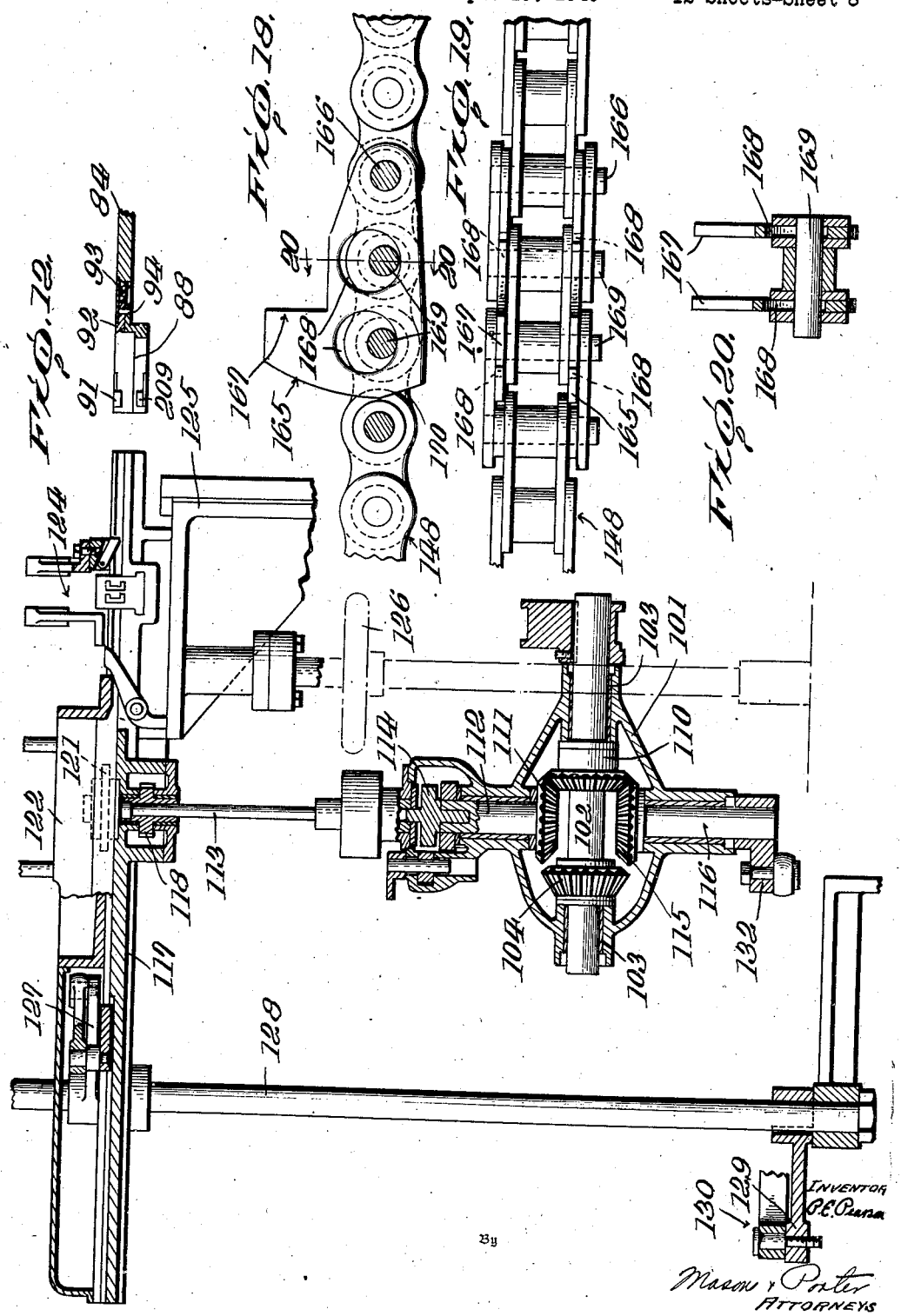

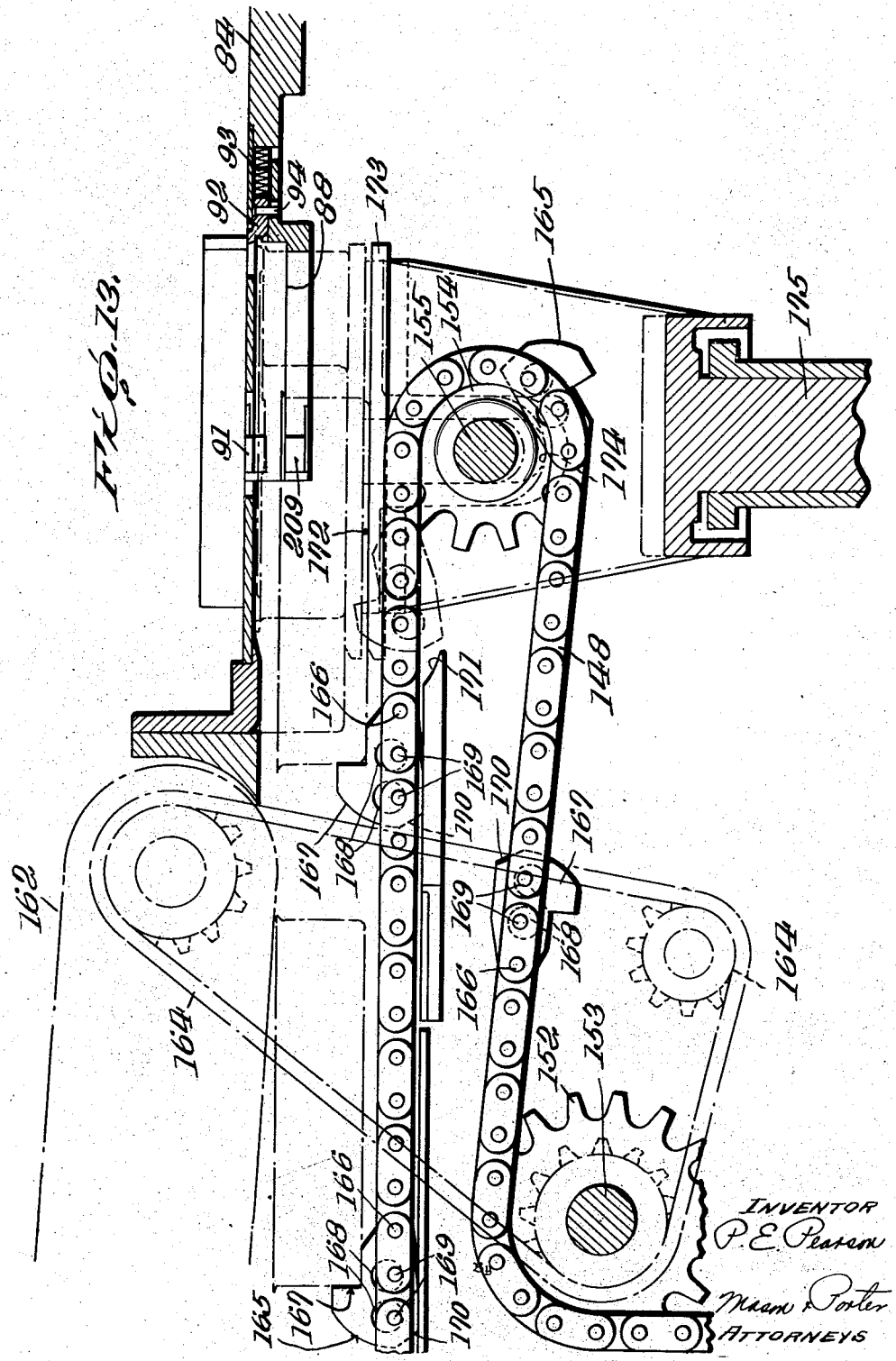

Nov. 14, 1944. P. E. PEARSON 2,362,848
CAN CLOSING MACHINE
Filed Sept. 19, 1940 12 Sheets-Sheet 10
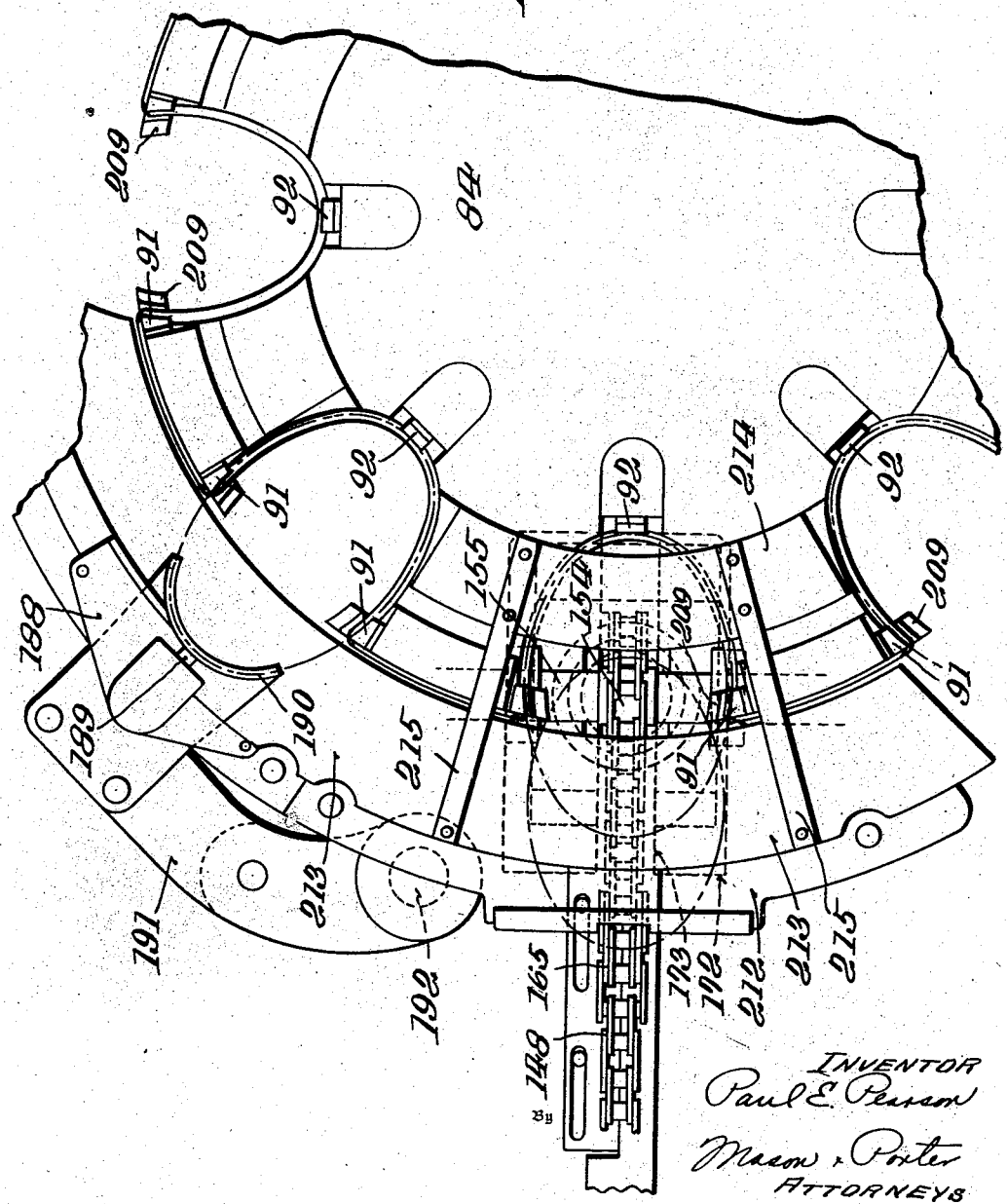

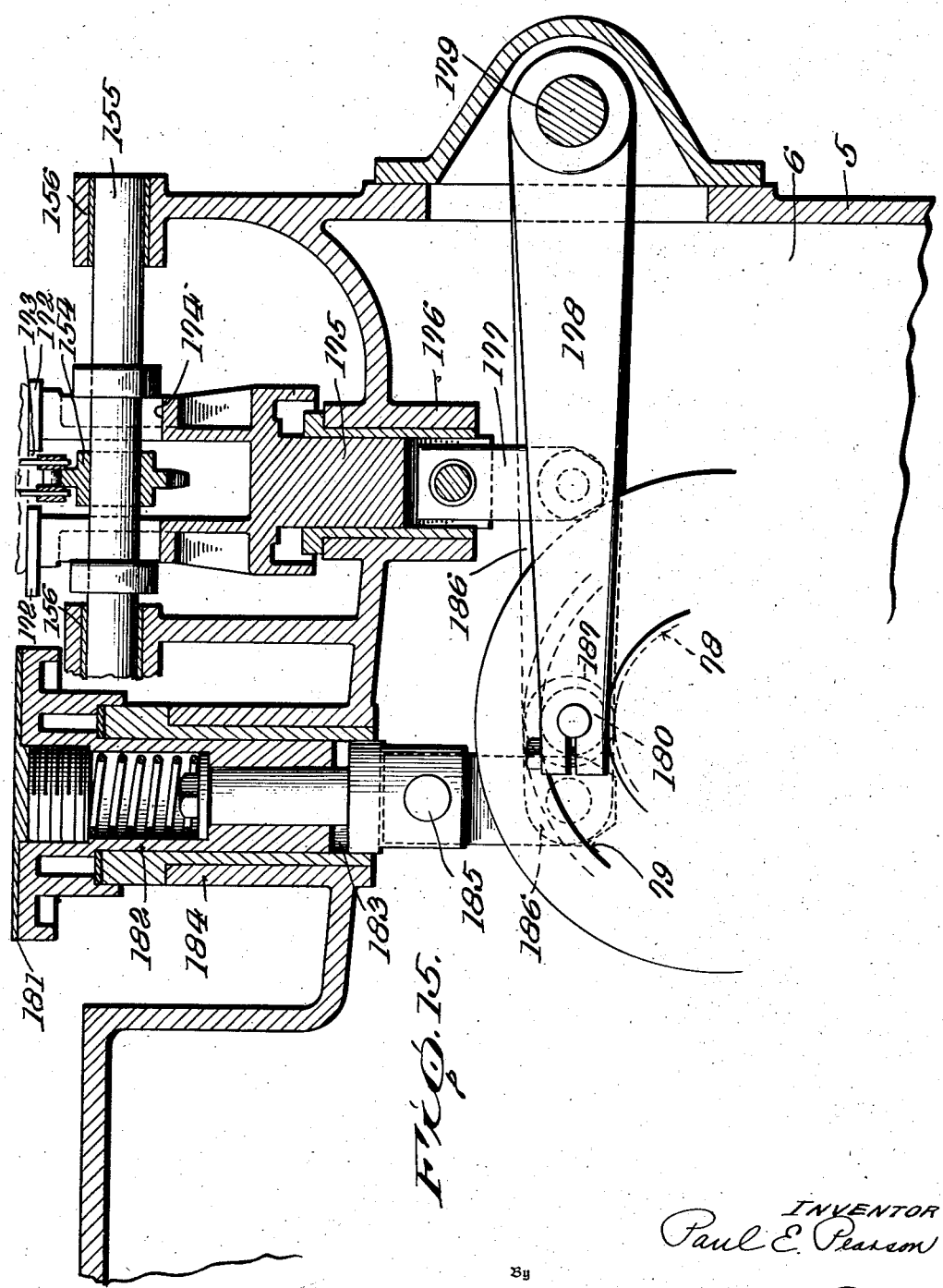

Nov. 14, 1944.     P. E. PEARSON     2,362,848
CAN CLOSING MACHINE
Filed Sept. 19, 1940      12 Sheets-Sheet 12
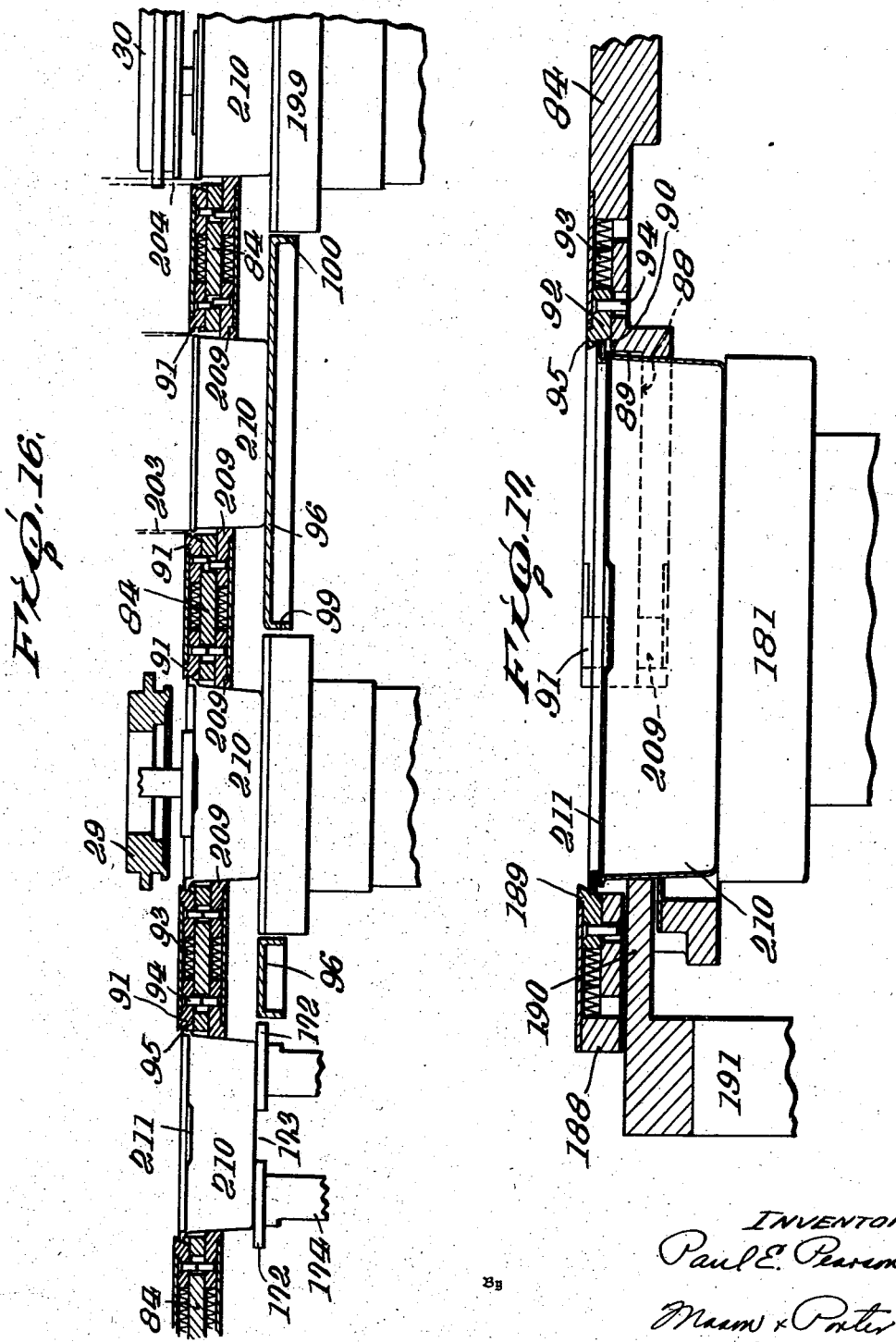
INVENTOR
Paul E. Pearson
Mason & Porter
ATTORNEYS Patented Nov. 14, 1944

2,362,848

UNITED STATES PATENT OFFICE 2,362,848

CAN CLOSING MACHINE

Paul E. Pearson, Chicago, Ill., assignor to Continental Can Company, Inc., New York, N. Y., a corporation of New York Application September 19, 1940, Serial No. 357,459

6 Claims. (Cl. 113—115)

The invention relates generally to can closing machines, and more particularly to machines of this character wherein filled cans are fed into the machine and covers or end closures are fed into cooperative relation with the individual cans and then secured in product sealing relation on said cans. In machines of this character considerable difficulty is encountered in bringing into and holding the filled cans and covers in perfectly registered relation, and when the cans contain material quantities of liquid, fluid or semi-fluid products, the abrupt changes of direction to which the usual machine equipments subject the filled cans serve to spill quantities of said products with the result that machine parts are rendered messy and unsanitary. The present invention seeks to remedy these conditions.

An object of the invention is to provide a machine of the character stated embodying improved filled can handling mechanisms which avoid imparting to the filled cans abrupt direction change movements likely to spill fluid or semi-fluid products from said cans.

Another object of the invention is to provide a machine of the character stated embodying improved means for presenting and holding can closure members in perfect registry with the filled cans, and novel filled can handling mechanisms which move the filled cans into close proximity to the closure members without abrupt direction change movements likely to spill fluid or semi-fluid products from said cans.

Another object of the invention is to provide, in a machine of the character stated, novel can closure holding members capable of holding the closures in proper relation with the filled cans but which are yieldable to permit the filled cans to move into contact with said closures and then past said holding members into contact with closure securing means.

Another object of the invention is to provide certain new and useful improvements in can closing machines of the type disclosed in U. S. Letters Patent 1,961,994 issued June 5, 1934, to Nelson Troyer and Paul E. Pearson in which are included special means for handling oval cans and closures and including a turret having half oval can receiving pockets therein, novel spring fingers for holding the closures in registry with the cans, and novel means for imparting continuous, multi-directional movements to the filled cans, including a portion of indexing movement of said turret, for bringing the filled cans and closures into close proximity without spilling or sloshing of contents from said filled cans.

Another object of the invention is to provide in a machine of the character last stated, novel means movable into and out of contact with turret carried oval cans for shaping them so as to accurately receive the associated closures just prior to the function of securing said closures on or sealing said cans.

With the above and other objects in view that will hereinafter appear, the nature of the invention will be more fully understood by following the detailed description, the appended claims, and the several views illustrated in the accompanying drawings.

In the drawings:

Figure 1 is a plan view of the machine, the seaming head, and the driving motor being removed.

Figure 2 is a vertical cross section taken on the line 2—2 on Figure 1.

Figure 3 is a fragmentary side elevation illustrating the can body feed-in mechanism, parts being broken away and in section.

Figure 4 is a detail vertical cross section taken on the line 4—4 on Figure 3.

Figure 5 is a detail vertical cross section taken on the line 5—5 on Figure 3.

Figure 6 is a detail vertical cross section taken on the line 6—6 on Figure 3.

Figure 7 is a detail vertical cross section taken on the line 7—7 on Figure 3.

Figure 9 is a horizontal section taken substantially on the line 9—9 on Figure 8.

Figure 10 is a plan view illustrating the cover feed-in mechanism.

Figure 11 is a vertical cross section taken on the line 11—11 on Figure 10.

Figure 12 is a vertical longitudinal section taken on the line 12—12 on Figure 10.

Figure 13 is an enlarged fragmentary vertical longitudinal section illustrating the means for feeding the filled cans into and lifting them in the turret pockets at the filled can receiving station.

Figure 14 is a fragmentary plan view illustrating the filled can receiving and first operation seaming stations of the machine.

Figure 15 is a fragmentary vertical cross section illustrating the filled can lifting means at the filled can receiving station, the lifting means at the first operation seaming station also being shown.

Figure 16 is a diagrammatic view illustrating several turret pockets in development, the relative positions of filled cans at the receiving station, the first and second operation seaming stations and at the idle station intervening said seaming stations being shown.

Figure 17 is a fragmentary vertical cross section taken on the line 17—17 on Figure 1.

Figure 18 is a fragmentary side elevation illustrating a portion of the filled can feed-in chain.

Figure 19 is a plan view of the chain portion illustrated in Figure 18.

Figure 20 is a detail vertical cross section taken on the line 20—20 on Figure 18.

Figure 8:
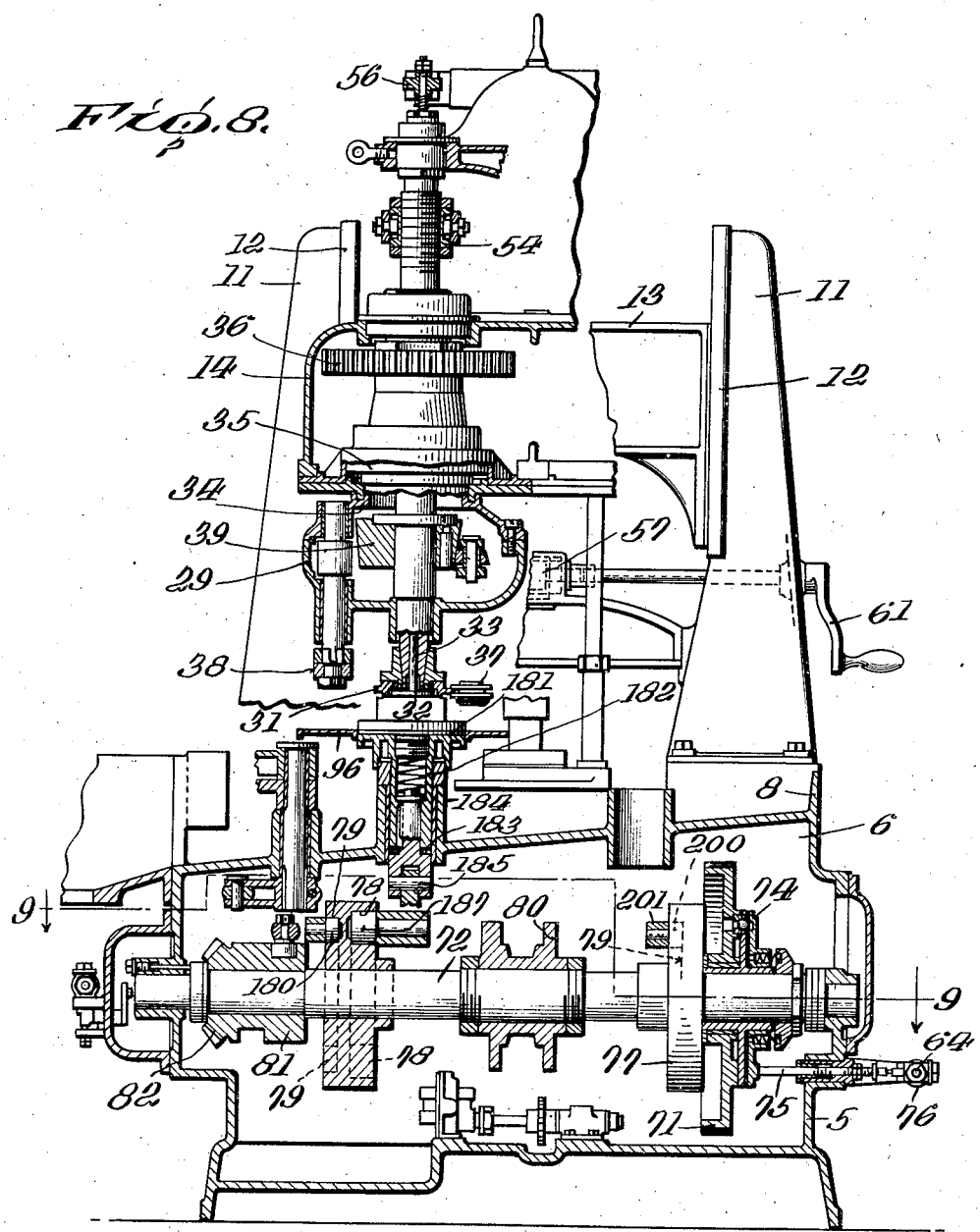
Figure 8 is a vertical cross section taken on the line 8—8 on Figure 2.

In the machine herein disclosed as an example of embodiment of the invention there is included a base frame 5 which is hollow to form a mechanism housing chamber 6, the latter being accessible through a removable door 7. The base frame housing includes a ceiling, or top closure wall 8 having a bearing well 9 formed therein and also equipped with a vertically disposed turret bearing sleeve 10.

Frame standards 11 are supported upon the base frame in parallel spaced relation so as to present the vertical slide guides 12 with which they are equipped in opposed relation. See Figures 1, 2 and 8.

The slide guides 12 of the standards 11 serve to vertically-adjustably support a frame 13 which carries a seaming head generally designated 14. The frame 13 is equipped with bearings 15 for rotatably supporting a main drive shaft 16 having a drive clutch disk 17 splined thereon and movable into and out of driving relation with a loose pulley 18 through the medium of shifter elements 19 operable by a shifter head 20 slidably mounted on the main shaft 16. The shifter head can be moved manually through the medium of a shifter lever 21 having a handle extension 22, and when the shifter head is shifted to bring about engagement between the driving disk 17 and the loose pulley 18 rotation is imparted to the main drive shaft 16 by a belt 23 which takes over the pulley 18 and over a variable speed drive pulley 24 mounted on the drive shaft of a motor 25. The motor 25 is supported on a bracket 26 which is vertically adjustable on a frame bracket 27 through the medium of an adjusting screw equipment 28.

The seaming head generally designated 14 includes first operation and second operation seaming equipments generally designated 29 and 30 respectively. Each of the seaming equipments 29 and 30 includes a stationary chuck 31, a knockout and follower pad 32 mounted on a vertically reciprocable actuator rod 33, a rotor 34 rotatably mounted in a bearing 35 in the seaming head and having a driver gear 36 secured thereon, and seaming rolls 37 carried on pivoted actuator arms 38 which are held against a vertically reciprocable actuator cam 39 by suitable spring equipments.

The driver gears 36 of the respective seaming equipments 29 and 30 mesh with and are driven by a driver gear 40 secured upon a shaft 41 which is vertically disposed and rotatable in bearings 42. The shaft 41 is spline-connected as at 43 to a lower shaft section 44 which is rotatable in a suitable bearing 45 mounted in the housing well 9. See Figures 2 and 8 of the drawings. A bevel gear 46 is affixed to the driver gear 40 and has rotation imparted thereto by a bevel pinion gear 47 secured upon the inner end of the main drive shaft 16.

The upper shaft section 41 also carries a driver pinion 48 which meshes with and imparts rotation to a ring gear 49 secured to a cam rotor 50 having rotative bearing at 51 on a vertically disposed supporting standard 52 fixed upon the seaming head frame. The cam rotor 50 is equipped with a cam groove 53 for imparting vertical reciprocations to the actuator cams 39 of the seaming equipments 29 and 30 through the medium of pivoted actuator levers 54, and a cam groove 55 for actuating the knockout and follower pad rods 33 of said seaming equipments through the medium of actuator lever means 56. Since the seaming mechanism generally designated 29 and 30 are substantially identical in form and function with those disclosed in detail in the Troyer and Pearson Patent 1,961,994, issued on June 5, 1934, further detailed description of the construction and operation of these seaming mechanisms herein is thought to be unnecessary.

A housing 57 is fixed to the frame standards 11, and an adjustable screw member 58 is vertically movable in and extends vertically from said housing. The screw member 58 threads through an adjuster worm wheel 59 held captive in the housing so that when rotation is imparted to said wheel it will cause the screw 58 to move upwardly or downwardly according to the direction of rotation. Rotation is imparted to the worm wheel 59 by a suitable manually operable crank 61. See Figures 2 and 8 of the drawings.

An air cylinder 62 is supported on the seaming head frame, and a piston 63 is reciprocable in said cylinder. Movement is imparted to the piston within the cylinder by air pressure, and the cylinder is connected by valve controlled pipe line equipment 64 with a suitable source of air under pressure (not shown). The piston is connected as at 65 with the clutch shifter lever 21, and it will be obvious that each time the piston is moved to the left, as viewed in Figure 2 of the drawings, the clutch elements 17 and 18 will be disengaged and operation of the machine as a whole will be stopped because rotation of the main driving shaft 16 is thus discontinued.

A driver bevel pinion 66 is secured upon the lower end of the lower shaft section 44 and imparts rotation to a similar pinion 67 secured on a shaft 68 horizontally rotatable in bearings 69 provided therefor in the base frame 5. See Figure 9. The shaft 68 also carries a driver pinion 70, and this pinion meshes with and imparts rotation to a large spur gear 71 which loosely surrounds a main cam shaft 72 which is horizontally rotatable in bearings 73 provided therefor in the base frame 5. Rotation of the gear 71 is imparted to the cam shaft through an overload release or safety clutch plate 74 splined on the cam shaft and which is longitudinally movable thereon whenever an overload is imposed upon the mechanism, as by jamming connected parts. Whenever the plate 74 is shifted axially upon imposition of an overload, it shifts an actuator pin 75 and opens a valve 76 for permitting air under pressure to enter the safety cylinder 62, thereupon to effect a declutching of the motor and stopping of the machine by discontinuing rotation of the main drive shaft 16. Similar safety equipments are provided at various parts of the machine, all effective in the manner just stated to discontinue operation of the machine whenever parts of the machine mechanisms tend to jam.

The cam shaft 72 carries a second actuator cam 77, for operating a lift associated with the second operation seaming equipment, and another cam which has a groove 78 in one face thereof for actuating a lift associated with the first operation seaming equipment and another groove 79 therein which serves to lift and lower the slide mechanism which lifts the cans at the filled can receiving station, all of which will be described in greater detail hereinafter. The cam shaft also carries a turret indexing cam 80, a half mold oscillating cam 81, and a driver bevel gear 82 to which the last-mentioned cam is affixed. See Figures 2, 8 and 9 of the drawings.

A turret shaft 83 is vertically rotatable in the frame bearing 10, and a turret 84 is secured to the end of the shaft, which projects above the ceiling or top closure wall 8 of the main base frame in the manner illustrated in Figure 2 of the drawings. At its lower end, the shaft 83 carries a driver disk 85 from which indexing rollers 86 depend for engagement in the indexing grooving of the indexing cam 80 hereinbefore referred to. The rollers 86 are equidistantly spaced and eight thereof are provided, one for each of the peripherally open pockets 87 provided in the turret 84. See Figures 1, 2, 13, 14 and 16.

Each of the turret pockets 87 includes a ledge 88 for extending beneath the outwardly turned flange of each infed, filled can, a relatively deep clearance 89 above said ledge to enable lift movement of the filled cans, and a cover or closure receiving ledge 90. A pair of grip fingers or lugs 91 overlie the cover receiving ledge at the respective sides thereof, and a similar finger or lug 92 overlies this ledge at its innermost extremity, the last-named finger being disposed radially with respect to the axis of the turret in the manner clearly illustrated in Figures 1, 13, 14, and 17 of the drawings. The fingers 91 and 92 are spring projected by spring equipments 93, and the degree of their projection or the extent to which they overlie the cover receiving ledge 90 is determined by limiting pins 94. See Figures 13, 16 and 17. All of the spring fingers preferably include cover edge engaging recesses 95.

While being moved about by the turret 84, filled cans are supported upon a table plate equipment 96 suitably supported as at 97 on the base frame top or ceiling 8, and are retained against movement out of the peripherally open turret pockets by an outer guide 98. A suitable opening 99 is provided in the table plate 96 at the turret station at which the first operation seaming equipment is mounted to permit vertical movement of a can lifter pad, and a similar opening 100 is provided in the table plate equipment at the turret station at which the second operation seaming equipment functions.

In an angularly projecting frame projection 101, there is mounted a shaft 102 which rotates horizontally in suitable bearings 103 provided therefore in said frame extension. The shaft 102 is driven by a bevel pinion couple 104 from a shaft 105 horizontally rotatable in bearings 106 provided therefor in said frame extension. The shaft 102 is driven by a bevel pinion couple 104 from a shaft 105 horizontally rotatable in bearings 106 provided therefor in the frame base 5 and which carries a bevel pinion gear 107 in mesh with and driven by the bevel pinion 82 mounted on the main cam shaft 72 hereinbefore referred to. A driver sprocket 108 is loosely mounted on the shaft 105 and is driven from said shaft through an overload release head generally designated 109. This overload release head is associated with suitable valve actuating equipment for effecting a discontinuation of rotation of the main driving shaft should any jamming of parts driven by the sprocket 108 occur in the manner hereinbefore described in connection with the overload release drive equipment 74, 75, 62.

The shaft 102 also carries a driver bevel gear 110 through which rotation is imparted to a bevel gear 111 mounted on a vertical shaft 112 and which serves to drive the cover feed screw shaft 113 through an intermediate clutch assembly generally designated 114. The gear 110 also drives a bevel gear 115 mounted on a vertical shaft 116 axially aligned with the previously mentioned shaft 112. The cover feed screw shaft 113 projects upwardly beneath the cover feedway or table 117 and carries a spur gear 118 at its upper end which drives pinion gears 119 at the respective sides of the cover feedway through the medium of intermediate idler pinions 120. Each of the pinions 119 is mounted on a vertically disposed shaft which carries a cover feed screw 121 at its upper end, said screws 121 serving to engage covers or can closure members at the bottom of the hingedly mounted cover stack 122 for the purpose of feeding said covers, one by one, onto the feedway or table 117.

Covers or can closure members deposited one by one on the feedway or table 117 are engaged by the feeder fingers carried by the reciprocable finger bars 123 and are thus fed step by step through the marking station, at which the marking equipment generally designated 124 is positioned, and into the peripheral pockets of the turret 84 where they are yieldably held by the spring fingers hereinbefore referred to. See Figures 9, 10 and 12.

The whole feedway or table 117 is vertically-adjustably mounted as at 125 and can be raised or lowered in order to adapt the table for feeding cans of different depths through the medium of a hand screw equipment generally designated 126.

The finger bars 123 are connected by crank and link connections 127 with a vertically disposed, oscillatory shaft 128. A crank 129 is fixed to the lower end of the shaft 128, and oscillatory movement is imparted to this shaft by a pitman 130 including an overload release or safety clutch equipment 131 and which connects at its other end with a crank 132 secured to the lower end of the rotary shaft 116 hereinbefore referred to.

It will be observed by reference to Figure 1 of the drawings that the covers fed one by one from the bottom of the stack are forced onto the cover receiving ledges 90 defining the peripheral pockets in the turret 84 and are there yieldably held in place by the gripper fingers 91 and 92 associated with the respective pockets, two opposed side edge gripper fingers 91 and one end or radial finger 92 being associated with each said pocket.

An outstanding purpose of the present invention is to so feed the filled cans into the machine and onto the turret which indexes them through the various stations including the stations at which the first and second operation feeding functions take place that no objectionable sloshing or spilling of contents from the cans will occur such as commonly occurs in machines of the character herein described in which the filled cans being fed or moved are subjected to abrupt movement direction changes. In order to accomplish the above mentioned outstanding purposes, there is provided a can feed table generally designated 133 and which is supported as at 134 on the base frame. The feed table includes a filled can feed guideway 135 leading toward the axis of the turret 84 and the peripheral pockets in the turret which are presented successively at the feeding station disposed at the terminus of this filled can in-feeding equipment.

On the feed table the filled cans are fed initially along a continuously traveling chain equipment comprising a short chain, which takes over a sprocket 136 on a shaft 137 and over a sprocket 138 on a shaft 139, and a long chain 140 which takes over a sprocket 141 on the shaft 137. The shaft 137 is equipped with a long pinion 142 which drives a pinion 143 on a stub shaft 144 connected in driving relation, through a bevel gear couple 145, with a timing spiral 146 which times the travel of and definitely spaces the oval filled cans moving along over the short and long chains just referred to. The traveling filled cans are yieldably opposed by a wall member 147. A main feed-in chain 148 is aligned with the short chain previously referred to, and this main feed chain passes over a sprocket 149 on a cross shaft 150, over an idle sprocket 151, over a driver sprocket 152 mounted on a cross shaft 153, and over a sprocket 154 on a cross shaft 155 rotatable in suitable frame bearings 156 and which also carries a sprocket 157 of which more will be said later. The shaft 153 is driven by sprocket and chain connections 158 from the driver sprocket 108 hereinbefore referred to.

The long chain which passes over the sprocket 136 also passes over and is driven by a sprocket 159 mounted on a shaft 160 to which rotation is imparted from the shaft 150 through a gear train generally designated 161.

Filled cans which are moved along toward the turret in equidistantly spaced relation by the main feed-in chain 148 pass under a filled product presser belt 162 which is passed about supporting pulleys 163 one of which is driven by sprocket and chain connections 164 with the cross shaft 153 in the manner best illustrated in Figure 3 of the drawings. It will be observed by reference to Figure 3 that the belt 162 is inclined downwardly and progressively packs or presses the filled products in the cans so as to avoid portions of the filled products projecting above the upper extremities of the open cans.

In order to feed the filled cans positively and in equidistantly spaced relation, the main feed-in chain 148 is provided with a plurality of equidistantly spaced driver lugs 165 each of which is pivoted as at 166 to the chain and has an upstanding, wide spread drive lug portion 167 presented for engagement with the trailing ends of the filled cans. A side portion of each lug is disposed at one side of the chain 148 in the manner best illustrated in Figures 18, 19 and 20 of the drawings, and each side portion is equipped with two large apertures 168, said apertures surrounding limiting pins 169 projecting laterally from the chain and serving to permit a considerable amount of swinging movement of the driver lugs about their pivotal connections 166 with the chain. By reason of the provision of these apertures and the pivotal mounting of the travel lugs, the lugs are free to adjust themselves while the chain is passing about the sprockets over which it takes, and each lug is permitted to move down out of driving relation with the filled can being fed in thereby in a manner and for a purpose later to be described. During the normal filled can feeding function, each lug is supported in the operative position illustrated in full lines in Figures 13 and 18 of the drawings by feed-in trackway portions over which the chain passes. Each lug includes trailing cut off or release portions 170 which drop off the release end portion 171 of the supporting track so that the lugs can move out of feeding engagement with the filled cans just as the cans reach the inner limit of the turret pockets into which they are fed.

At the filled can receiving station the chain lugs 167 feed individual filled cans onto a lift pad 172 which is provided with a central cutout or clearance 173 for permitting travel movement of the chain lugs 167. See Figures 1 and 13. The pad 172 straddles the shaft 155 as at 174 and is carried on a plunger 175 which is vertically reciprocable in a frame guide 176 and is pivot-link-connected as at 177 at its lower end with an actuator arm 178 pivotally mounted on a pivot shaft 179 supported in the base frame in the manner best illustrated in Figures 2, 9 and 15 of the drawings. The actuator arm 178 carries a roller 180 which is engaged in the cam groove 79. The cam groove 79 is so shaped that the lift pad 172 starts to rise while a given can is being moved over the lift pad and toward the turret receiving pocket, said upward movement of the pad commencing while approximately one-third of a given filled can has not as yet passed onto said pad. In other words, the pad starts to lift a given can as soon as two-thirds of that can has been moved onto the pad by the respective feed-in lug 167, and this lifting function of the pad is not discontinued in any given instance until the particular filled can is moved wholly into the receiving pocket turret and the turret commences its indexing movement for the purpose of moving that can toward the station at which the first operation seaming function is performed. In this manner the filled cans are fed into the machine by a continuous movement followed by a lifting of the filled can for the purpose of bringing the upper extremity in close proximity to the overlying cover or can closure, in turn followed by a measure of indexing movement, the movement of the filled can toward the axis of the turret effected by the respective chain lug 167, the lifting movement effected by the pad 172, and the measure of indexing movement effected by indexing of the turret, all being continuous without any abrupt change in direction or speed of travel of the filled can likely to cause contents thereof to slosh or spill from the can.

The above described positioning of the filled cans in the turret pockets in very close relation to the overlying cover or can closure is accomplished in a manner assuring against undesirable sloshing or spilling of contents of the can and by multi-direction continuous movement as distinguished from abrupt direction change movements such as the conventional straight line feeding of the cans into the turret pockets, straight line lifting of the cans in the turret pockets, and the abrupt indexing movement in a single plane customarily performed in machines of this character.

Each filled can is pushed entirely into the turret pocket presented at the receiving station by the respective chain lug 167, and the indexing of the turret commences just before the feed-in lug finally seats the can entirely in said pocket, and for this reason the lugs 167 are made sufficiently wide to allow for the measure of lateral or indexing movement of the can just referred to. The instant that a given lug 167 completes its can feeding function it drops off the release end 171 of the supporting track surfaces and becomes disengaged from the can and positioned for passing about the sprockets. In the particular machine herein illustrated the lug feeding function and the turret indexing movement overlaps to the extent of two and one-half degrees of angular travel corresponding to twenty degrees of cycle time. During the forty degrees of cycle time the turret 84 indexes a given can while the lift pad remains elevated, and then the lift pad 172 is dropped within twenty degrees of cycle time, thus clearing the following can.

Beneath the turret station at which the first operation feeding function is performed, there is provided a lift pad 181 including a yieldably mounted upper stem 182 and a lower or plunger portion 183 which is vertically-reciprocable in the frame guide bearing 184 and is pivotally connected as at 185 at its lower end to the first operation lift lever 186 pivotally supported on the pivot shaft 179 hereinbefore referred to. The lever 186 carries a roller 187 which engages in the cam groove 78 and serves at the proper time to lift the filled can above the table 96 to yieldably press the cover against the chuck 31 of the seaming head. See Figures 2, 9, 15 and 16.

At the first operation seaming station a bridge member 188 is mounted and serves as a support for a fourth stationary spring finger 189 which opposes each radial spring finger 92 presented at that particular station for cooperating with it and the remaining spring fingers 91 in perfectly aligning the respective cover or can closure with the underlying filled can. In order to further assure perfect registry of each filled can and its associated cover at this station, there is provided a half mold or rounding member 190 which is shaped to snugly embrace the end of a given filled can projecting from a turret pocket presented at the first operation seaming station for the purpose of rounding up or perfectly positioning said filled can during the first operation seaming function.

In order to move the half mold member into and out of engagement with filled cans for the purpose just above stated, this member is mounted on an arm 191 secured to an oscillatory shaft 192 supported in a suitable frame bearing and equipped with a crank 193 which is link-connected as at 194 with a bell crank lever 195 supported on a fixed fulcrum 196 and having a roller 197 engaged in the cam groove 81. The cam groove 81 is suitably shaped to actuate the lever and link connections just described to press the half mold against each filled can presented at the first operation seaming station for the purpose of perfectly aligning that can with the overlying cover which is to be double-seam secured thereon.

It is to be understood that after each filled can has been perfectly registered with the overlying cover, the first operation lift pad lifts the can into engagement with the seaming head chuck 31 in the manner hereinbefore described. Prior to the lifting of the can the follower pad 32 is moved down into engagement with the cover in the manner illustrated in Figure 16 of the drawings and then moves up with the cover and can body when the pad 181 is lifted, the yieldable spring fingers 91, 92 and 189 yielding to permit such upward movement. After the seaming operation has been completed in the well known manner, the pad 181 is again lowered to restore the can and the partially seamed closure to the level of the table 96.

Following the completion of the first operation seaming function the turret is indexed to present the can at an idle station, and upon the next indexing of the turret said can is presented at the station at which the second operation seaming function is performed.

At the station at which the second operation seaming function is performed a lift pad 199 identical in construction with the pad 181 disposed at the first operation seaming station is provided, each of these pads including equipment permitting them to yield when they are pressed tightly against the chuck 31 of the respective seaming head equipments 29 and 30. The pad 199 is pivotally connected as at 200 at its lower end to a lift lever 201 pivotally supported on the pivot shaft 179 and equipped with a roller 202 engaged in the cam groove 79 which is suitably shaped to effect the desired lifting and lowering of said pad.

Since the cover is partially attached when a given can reaches the station at which the second operation seaming function is performed, there is no need at this station for a half mold can registering means or a fourth spring finger.

The spring finger equipments which yieldably engage the covers in the turret pockets are so spaced that they overlie and yieldably engage the cover edges before any seaming is performed thereon, but it will be observed by reference to Figure 16 of the drawings that the spring fingers clear the edges of the partially seamed cover as at 203, following the first operation seaming function, and clear to an even greater extent the wholly seamed cover following the second operation seaming function as at 204 so that after the completion of the first operation seaming function and also the second operation seaming function the can can be lowered without the edges of the cover engaging the spring fingers which previously yieldably gripped the same.

At the station following that at which the second operation seaming function is performed, the cans are centered over a feed-off trackway 205 and over a feed-off chain 206 which functions in association with said trackway. The feed-off chain carries suitable equidistantly spaced feed lugs and passes over sprockets 207 one of which is driven by chain and sprocket connections 208 from the sprocket 157 carried by the shaft straddled by the lift pad equipment 172 hereinbefore referred to. See Figures 1 and 3 of the drawings.

It is preferred that spring fingers 209 similar to those previously described as overlying and yieldably gripping the can covers be provided at the respective sides of the turret pockets for yieldably gripping the sides of the filled cans just beneath the ledges 88 and outwardly of or beyond the lateral center or minor axes of the oval shaped cans. See Figures 13 and 14. In the drawings, the filled cans are indicated at 210 and the covers at 211.

It is also preferable to provide a bridge casting or bracket 212 over the feed-in or filled can receiving station for the purpose of supporting an outer arcuate cover plate 213 and a second or inwardly spaced arcuate cover plate 214, said plates being supported in spaced relation by bridge pieces 215. These arcuate plates 213 and 214 extend from a point in advance of the feed-in or filled can receiving station to the station at which the first operation seaming function is performed and serve to additionally assure against lifting of the covers 211 out of the turret pockets because of contact therewith of any can fill particles which might be projecting above the upper surface of the open cans as they are lifted into close proximity to the associated covers in the novel manner hereinbefore described.

In operation the filled cans are fed into the machine in equidistantly spaced relation and are engaged by the chain lugs 167 and moved onto the receiving and lifting pad 172 at the receiving station. As soon as two-thirds of a given can has been moved onto the pad by the respective feed lug 167 the pad 172 starts to lift the can 210 so as to bring the upper surface thereof into close proximity with the overlying cover 211 which has been placed on the receiving ledge 90 and yieldably gripped thereon at the preceding station. As previously described, the feeding movement of the respective lug 167 and the lifting movement of the pad 172 are continuous, and not abrupt, and continue until the respective can 210 is almost fully seated in the respective turret pocket at which time indexing movement of the turret commences, the three distinct movements, namely, feeding movement onto the pad, lifting movement on the pad, and the small measure of indexing movement with the turret being continuous and without abrupt sudden change of direction.

At the station at which the first operation seaming function is performed, the half mold member 190 assures perfect registry of the can 210 beneath the cover 211 which is to be seamed thereon while a fourth spring finger 189 aids the three spring fingers 91 and 92 previously referred to in assuring perfect registry of the cover. At this station the follower pad 32 moves down into contact with the cover 211 and then moves up with the can and cover as the pad 181 lifts the can to chuck the same during the first operation seaming function, after which the pad 181 again lowers the can so that it can be indexed two steps to the station at which the second operation seaming function takes place, at which second operation seaming station the function of the respective follower pad 32 is repeated and the second operation lift pad 199 functions to lift and again lower the can for the purposes previously described. After each can is securely seamed at the second operation seaming station it is indexed to the feed-off station and removed from the respective turret pocket by the feed-off chain 206.

It is, of course, to be understood that the details of structure and arrangement of parts may be variously changed and modified without departing from the spirit and scope of my invention.

Having thus described the invention, what I claim as new and desire to secure by Letters Patent, is:

1. In a can closing machine, an indexed turret having pockets in its periphery, means for supporting can covers in the pockets of said turret, and means for feeding filled cans into the turret pockets beneath said covers and including a feed chain, equidistantly spaced feeder lugs pivotally mounted on said chain and movable into and out of effective feeding relation to the filled cans, and track members directly engaged by said lugs and normally effective for holding the lugs in position for feeding engagement with the filled cans and including lug release portions so spaced with relation to the turret as to cause the lugs to move out of feeding contact with filled cans as they become seated in the turret pockets, said lugs having apertures therein and said chain having pins projecting into the apertures and of lesser diameter than said apertures so as to be freely movable in said apertures and yet effective to limit pivotal movement of said lugs.

2. In a can closing machine, an indexed turret having pockets in its periphery, means for supporting can covers in the pockets of said turret, means for feeding filled cans into the turret pockets beneath said covers and including a feed chain, equidistantly spaced feeder lugs pivotally mountd on said chain and movable into and out of effective feeding relation to the filled cans, and track members normally effective for holding the lugs in position for feeding engagement with the filled cans and including lug release portions so spaced with relation to the turret as to cause the lugs to move out of feeding contact with filled cans as they become seated in the turret pockets, a vertically reciprocable lift pad structure for lifting filled cans into close proximity with overlying covers while said cans are being moved into the pockets by said feeder lugs, a sprocket supporting the chain at the position of the lift pad, and a shaft supporting the sprocket, said lift pad having a vertical slotway straddling said sprocket shaft.

3. In a can closing machine, a rotary pocketed turret, means for supporting can covers in the pockets of said turret, and means for feeding filled cans individually into said pockets and in close proximity to and under said covers by continuous forward and upward motion thereby to avoid abrupt direction change movements of said cans and the spilling of contents therefrom, said last named means including a continuously moving filled can engaging feed chain having projectible and retractible filled can engaging feeder lugs thereon and a lift pad for receiving each can from said chain and lifting the same while it is moving into the respective turret pocket, and means effective to hold said lugs in engagement with cans until each thereof is fully seated in a pocket and close beneath a cover supported in said pocket and then release said lugs to discontinue their effective feeding engagement with the cans and permit the chain to move on directly beneath the last fed can without imparting additional movement thereto.

4. In a can closing machine, a rotary pocketed turret, means for indexing the turret station by station, means for supporting can covers in the pockets of said turret, downwardly and inwardly bevelled diametrically oppositely disposed spring grip fingers for yieldably holding each cover in the pocket into which it is fed, means for feeding filled cans individually into position in said pockets with the open top of each thereof close beneath a cover supported in the respective pocket by continuous forward and upward motion thereby to avoid abrupt direction change movements of said cans and the spilling of contents therefrom, said last named means including a lift pad for lifting infeeding filled cans toward said supported covers, and arcuate track means overlying said turret and said lift pad and of limited length for extending only a short distance over said lift pad and engageable by covers at points spaced inwardly and outwardly of the positions of said spring grip fingers and cooperating with said fingers in preventing displacement of the covers by the fill in filled cans as they are being lifted on said pad.

5. In a can closing machine, a rotary pocketed turret, means for supporting can covers in the pockets of said turret, means for feeding filled cans individually into position in said pockets with open tops thereof close beneath the covers by continuous forward and upward motion thereby to avoid abrupt direction change movements of said cans and the spilling of contents therefrom, said last named means including a continuously moving filled can engaging feed chain, equidistantly spaced feeder lugs pivotally mounted on said chain and movable into and out of effective feeding relation to the filled cans, track members normally holding the lugs in effective position and including lug release portions so spaced with relation to the turret as to cause the lugs to move out of feeding contact with filled cans as they become fully seated in the turret pockets, and a lift pad for receiving each can from said chain and lifting the same while it is being moved by the feeder lugs into the respective turret pocket.

6. In a can closing machine, a rotary pocketed turret, means for supporting can covers in the pockets of said turret, means for feeding filled cans individually into position in said pockets with open tops thereof close beneath previously placed turret supported covers by continuous forward and upward and then lateral motion, thereby to avoid abrupt direction change movements of said cans and the spilling of contents therefrom, said last named means including a continuously moving can engaging feed chain and a lift pad for receiving each can from said chain and lifting the same while it is moving into the respective turret pocket, pad lifting means, turret indexing means, and means driving said lifting means and turret indexing means in timed relation, said indexing means including a cam operatively connected with the turret for effecting movement of the turret on its axis laterally of the cans and timed to cause the lateral movement of the turret to overlap the feeding movement of said cans prior to the termination of the feeding of the cans into the pockets of the turret.

PAUL E. PEARSON.